Feb. 20, 1934.  J. MOORE  1,948,182
TOILET APPARATUS
Filed Jan. 29, 1931   10 Sheets-Sheet 1
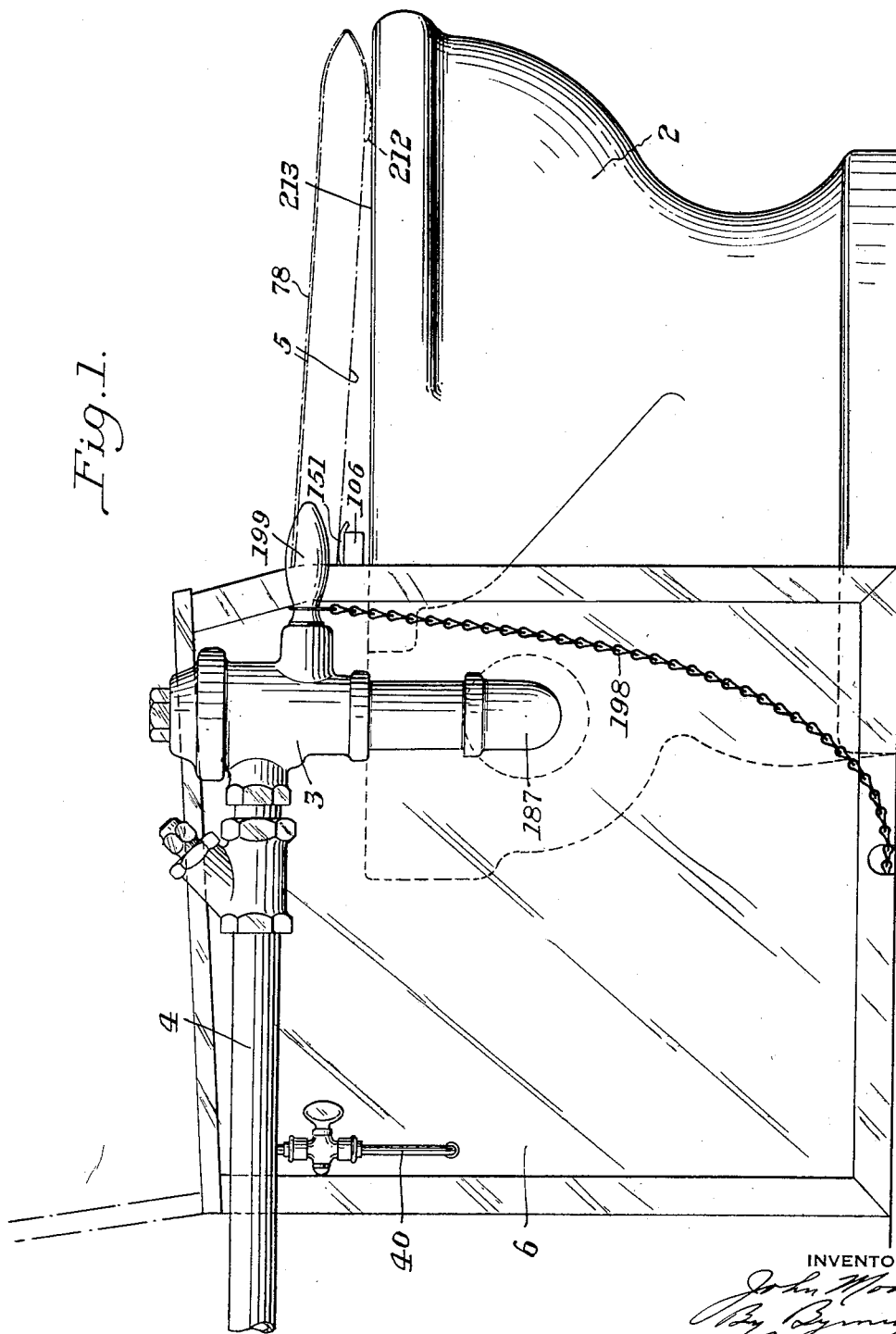

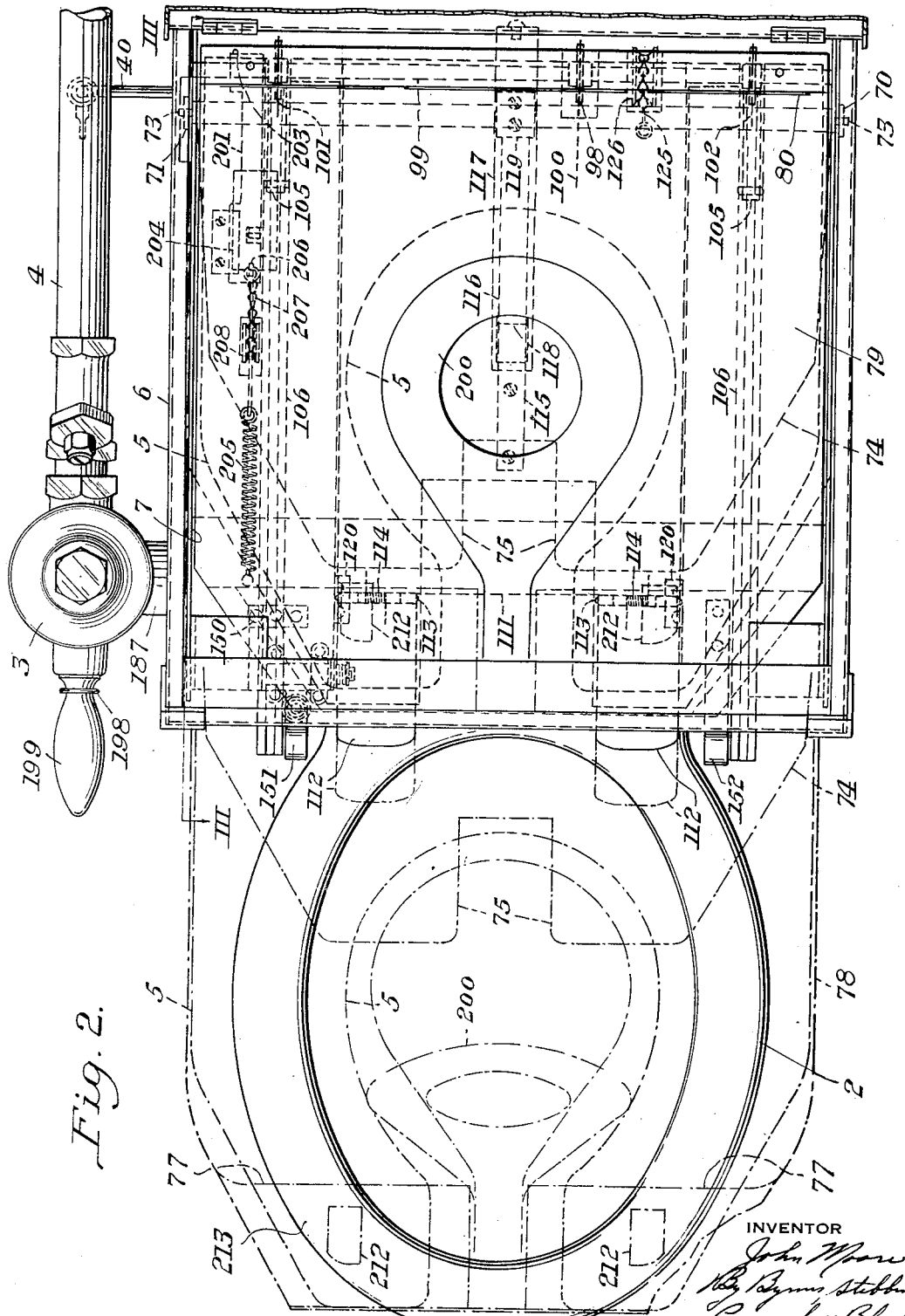

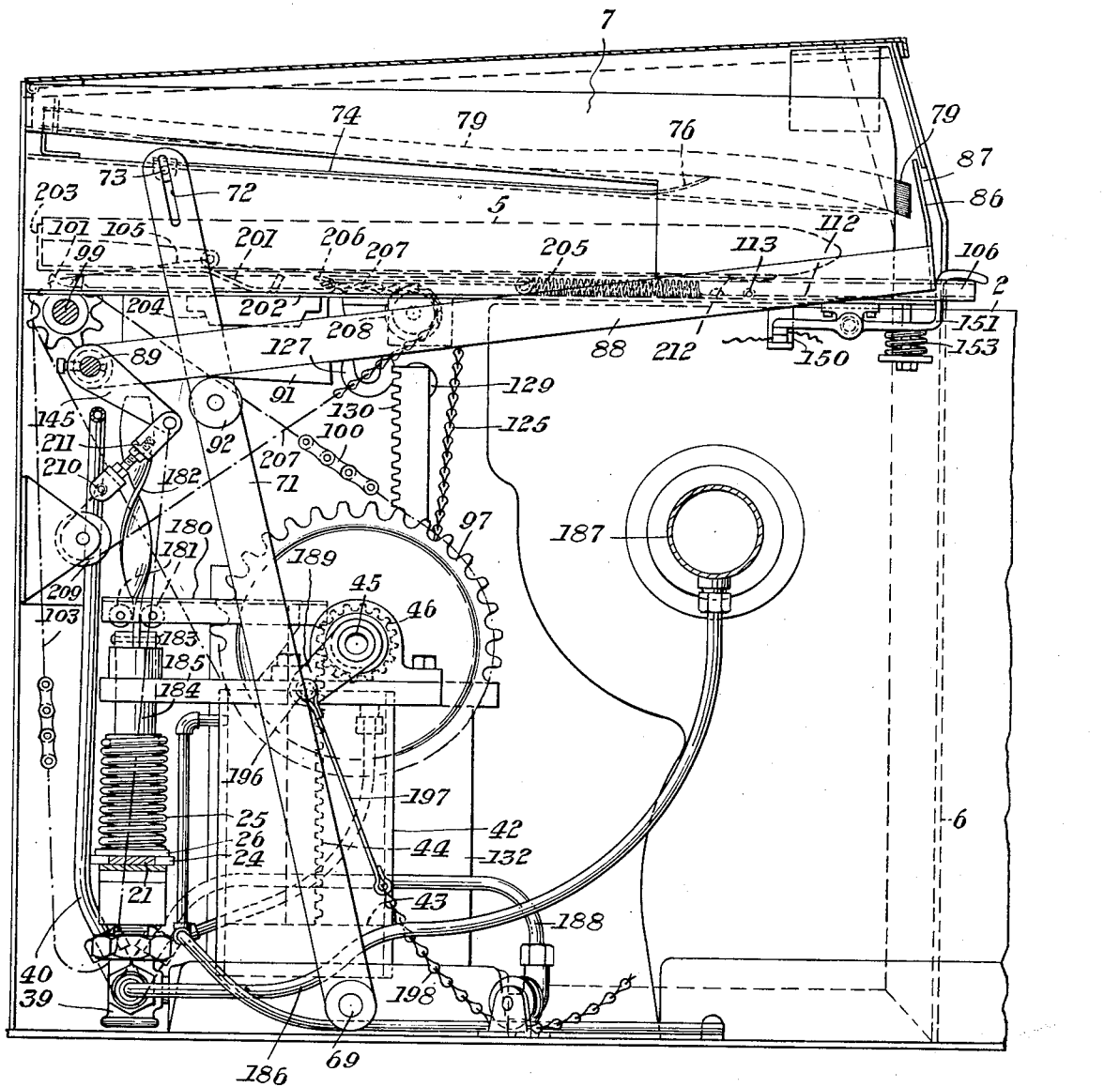

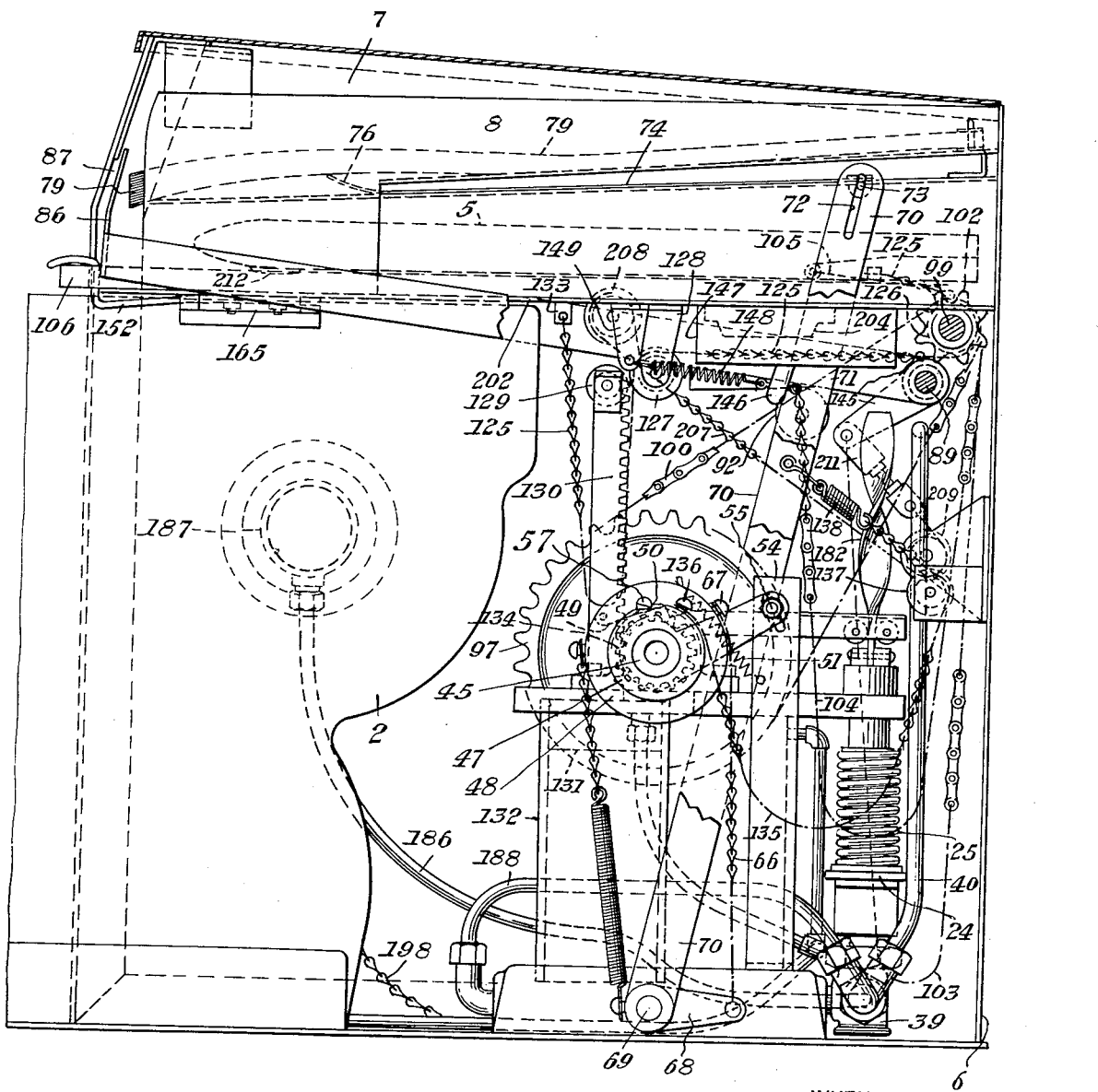

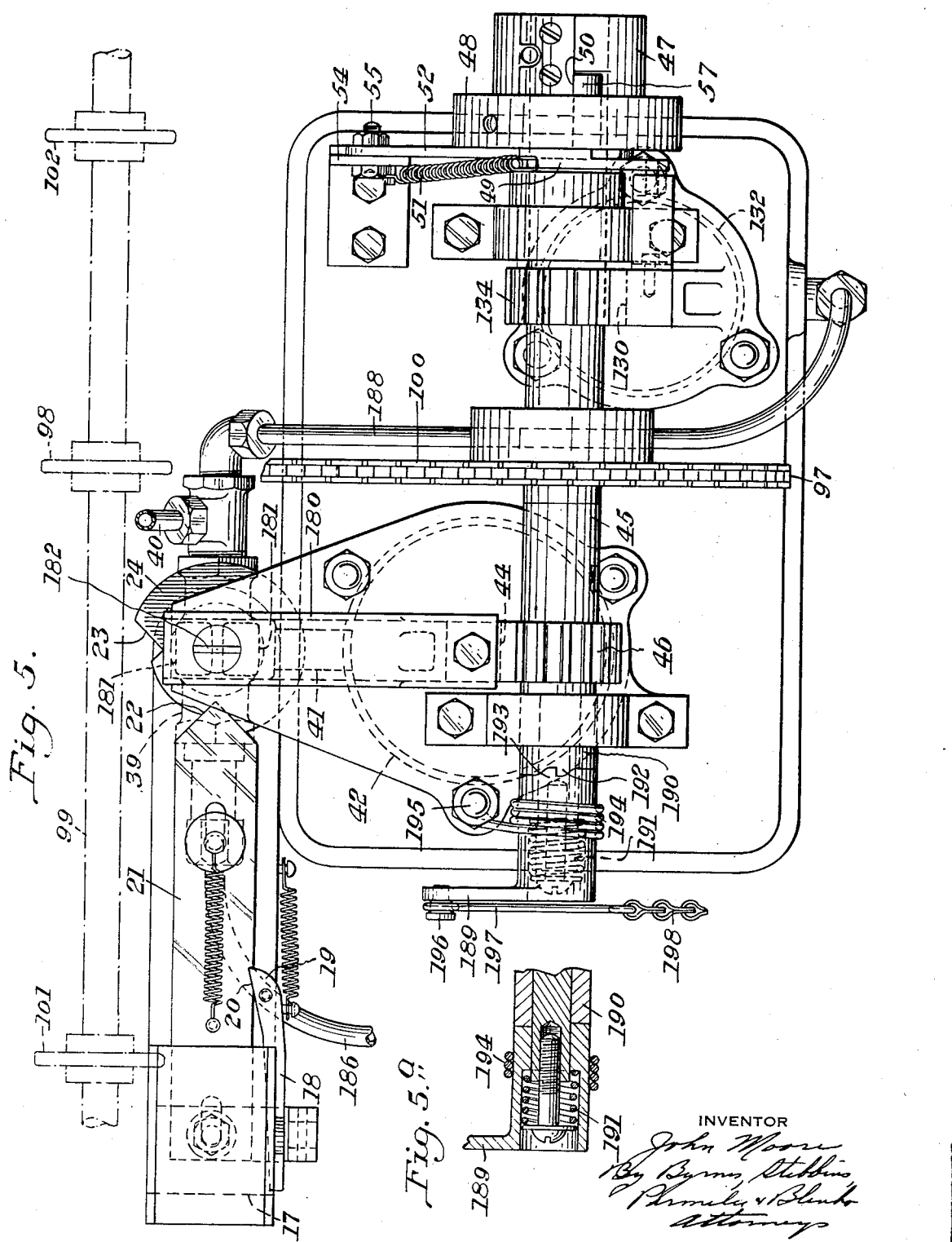

Feb. 20, 1934.    J. MOORE    1,948,182
TOILET APPARATUS
Filed Jan. 29, 1931    10 Sheets-Sheet 6
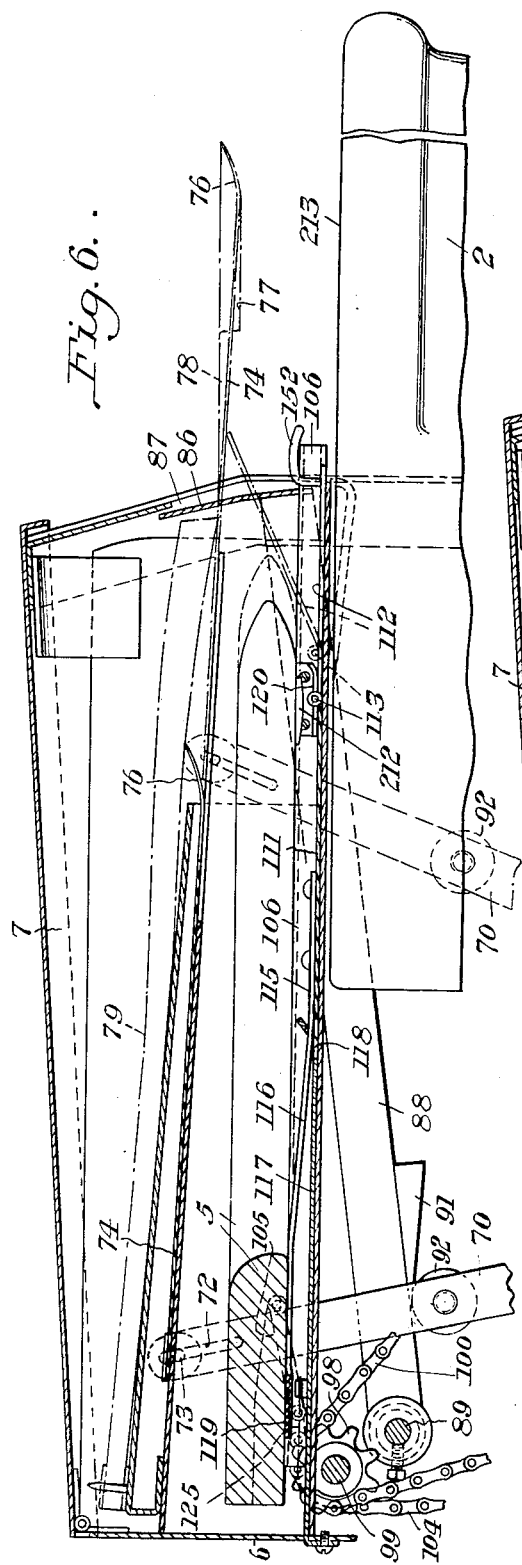
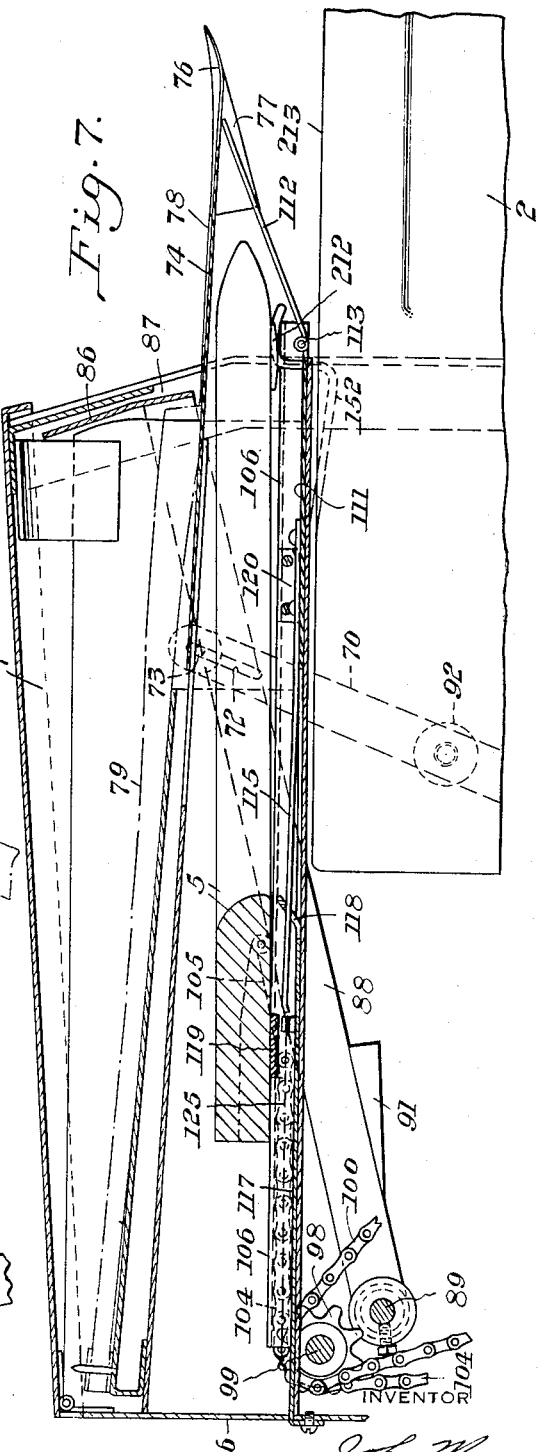
INVENTOR Feb. 20, 1934.   J. MOORE   1,948,182
TOILET APPARATUS
Filed Jan. 29, 1931   10 Sheets-Sheet 7
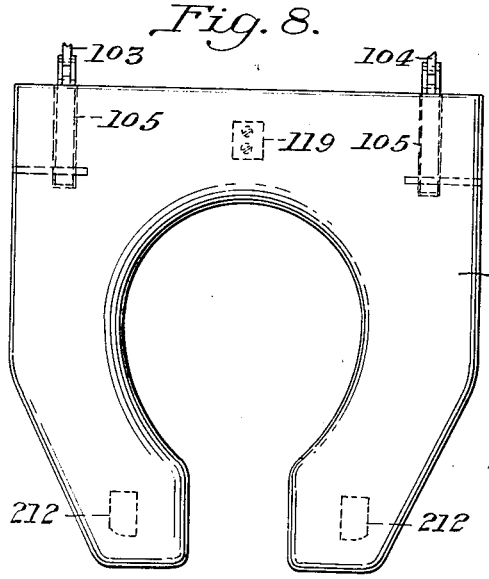
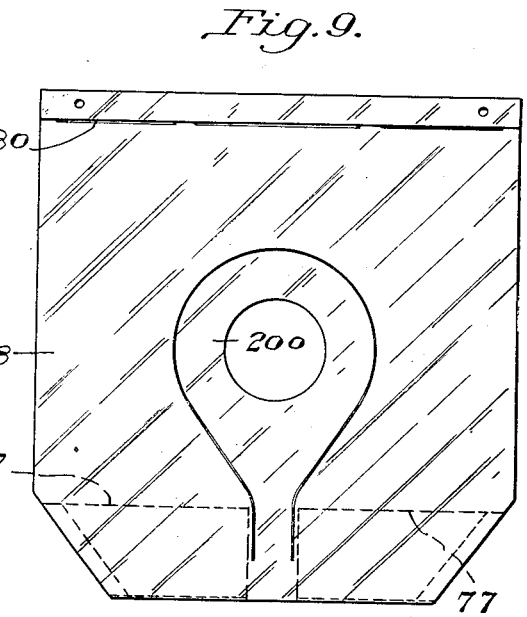
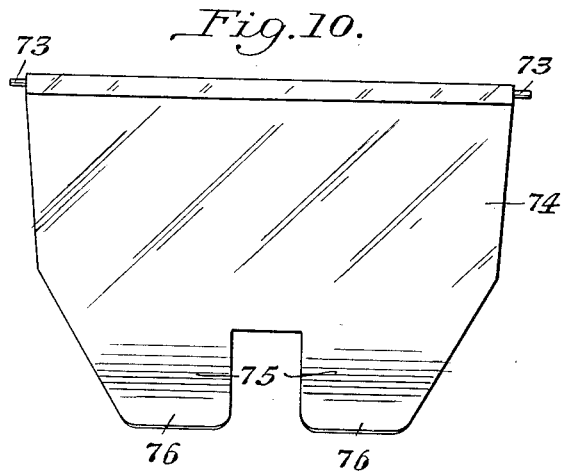
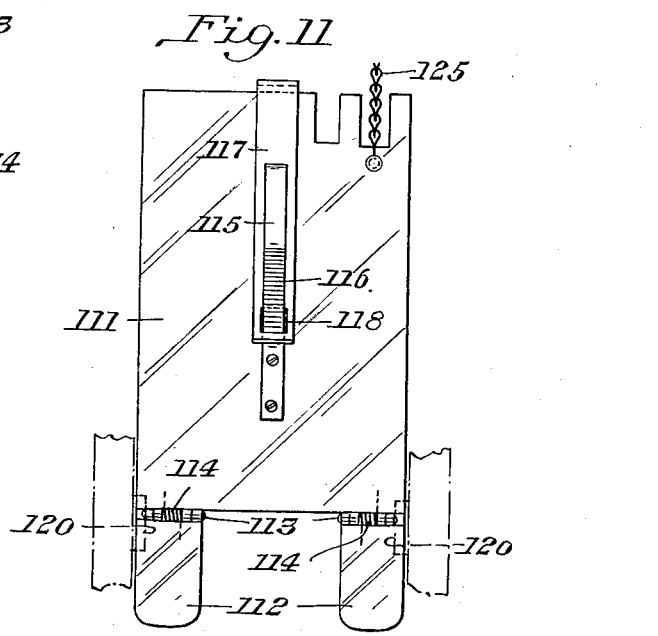
INVENTOR
John Moore
By Byrnes, Stebbins
Parmelee & Blenko
Attorneys Feb. 20, 1934. J. MOORE 1,948,182
TOILET APPARATUS
Filed Jan. 29, 1931   10 Sheets-Sheet 8
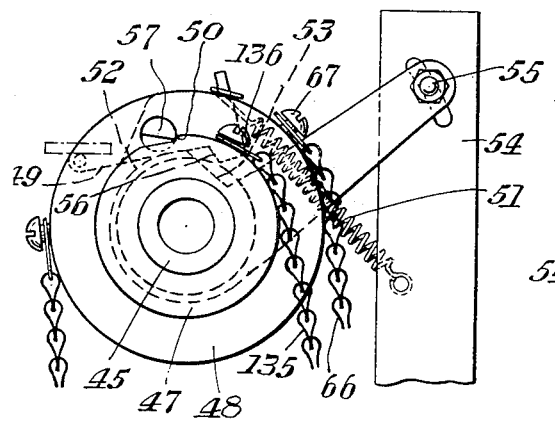
Fig. 12.
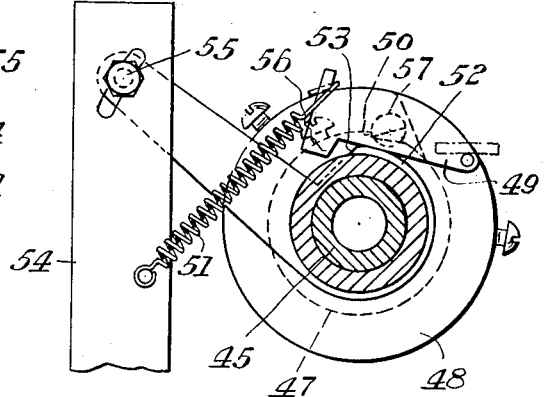
Fig. 14.
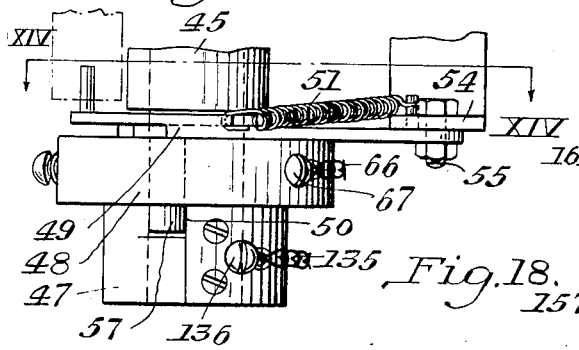
Fig. 13.
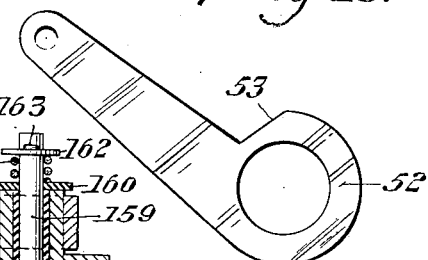
Fig. 15.
Fig. 18.
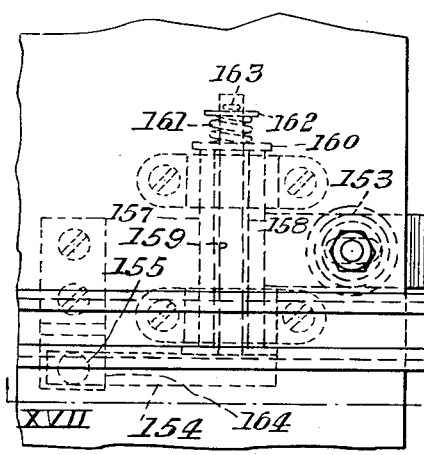
Fig. 16.
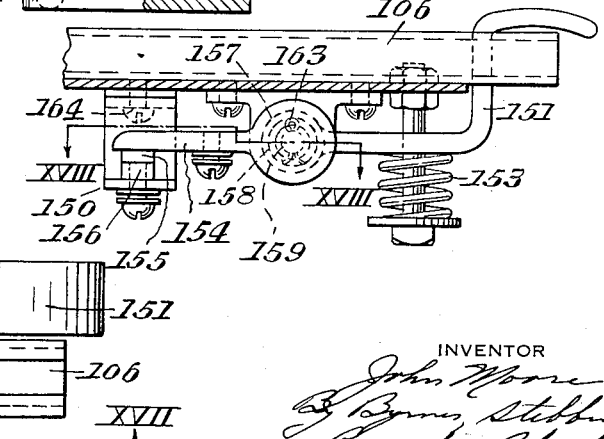
Fig. 17.
INVENTOR
John Moore

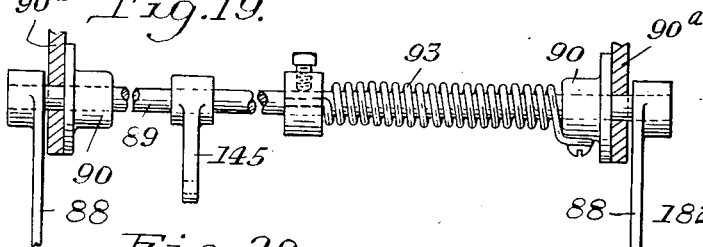
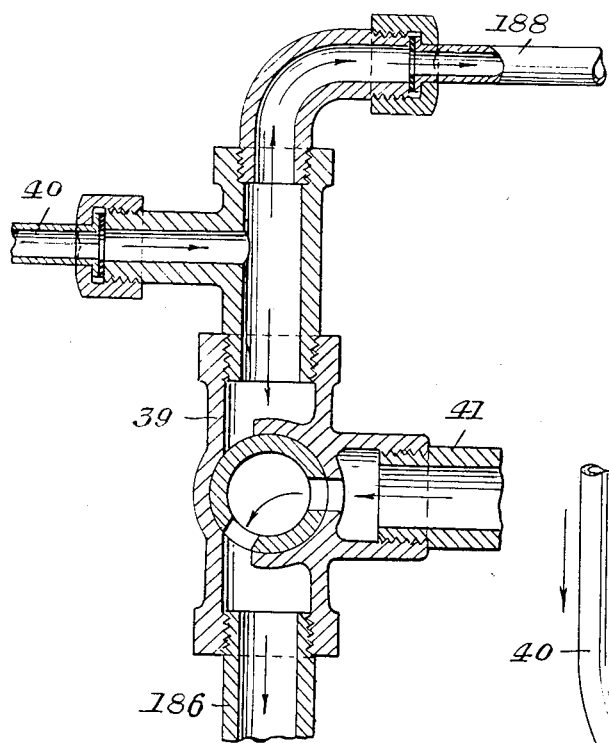
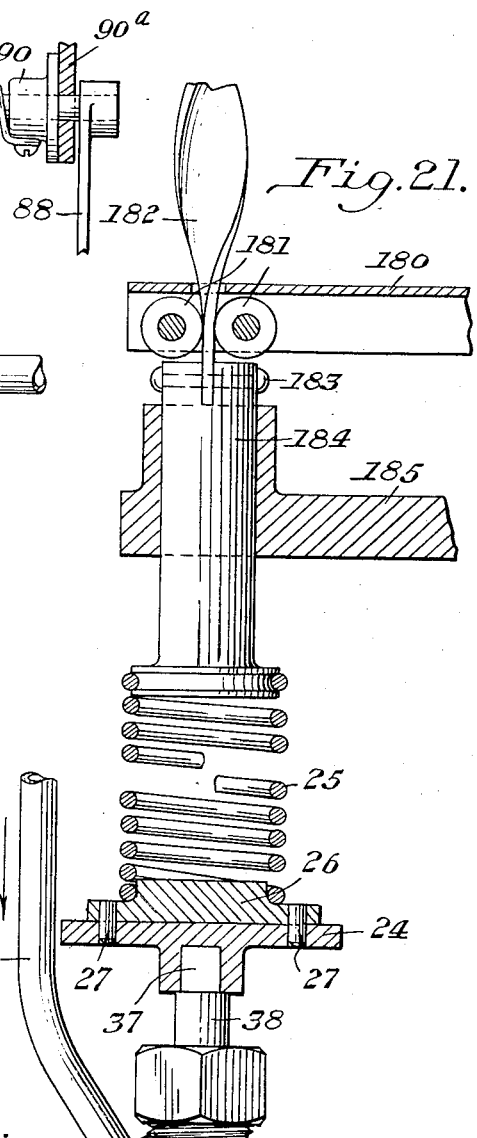
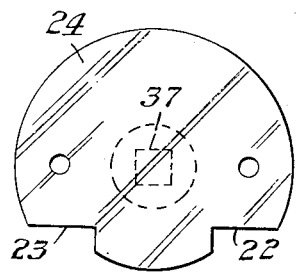
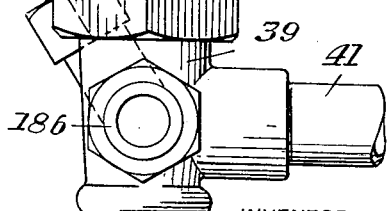

Feb. 20, 1934.   J. MOORE   1,948,182
TOILET APPARATUS
Filed Jan. 29, 1931   10 Sheets-Sheet 10

INVENTOR
John Moore

Patented Feb. 20, 1934

1,948,182

UNITED STATES PATENT OFFICE 1,948,182

TOILET APPARATUS

John Moore, Latrobe, Pa.

Application January 29, 1931. Serial No. 512,059

37 Claims. (Cl. 4—242)

This invention relates to toilet apparatus and more particularly to a new and improved sanitary toilet.

By my invention I provide improved toilet apparatus in which the seat is normally retained in a cabinet located adjacent the toilet bowl, and improved means whereby the seat may be automatically disposed over the bowl when it is desired to use the same, and for automatically withdrawing the same into the cabinet immediately upon the cessation of use thereof. I further provide improved means whereby a sanitary seat cover is automatically placed on the seat each time that it is desired to use the same. I further provide improved means whereby the sanitary cover may be automatically disposed of immediately upon the cessation of use of the seat. I also provide improved means whereby the apparatus may be operated upon the opening of a door of the compartment in which the apparatus may be placed.

My invention further consists in the variety of novel structural features, and the new arrangement and combination of parts hereinafter described.

In the accompanying drawings, I have shown for purposes of illustration only a preferred embodiment of my invention.

In the drawings,

Figure 1 is an elevational view of the right side of the structure which I provide.

Figure 2 is a top plan view of the apparatus shown in Figure 1, with the cover of the cabinet in open position, and showing the seat, the cover and the cover-ejecting mechanism in advanced position in dot-and-dash lines;

Figure 3 is a right hand elevational view of the seat compartment and the seat operating mechanism with the right side of the enclosing structure removed;

Figure 4 is a left hand elevational view of the seat compartment and the seat operating mechanism;

Figure 5 is a plan view of the hydraulic motors, the operating valve, the valve operating mechanism, the main shaft and the parts therein, and showing in dot-and-dash lines the auxiliary driving shaft;

Figure 5a is a sectional view of the flushing crank on the main shaft;

Figure 6 is a longitudinal section through the center of the seat compartment and the paper magazine;

Figure 7 is a longitudinal section through the center of the seat compartment and the paper magazine, the parts being shown in the position they occupy after the seat is partially ejected from the compartment;

Figure 8 is a plan view of the seat proper;

Figure 9 is a plan view of a pad of seat covers;

Figure 10 is a plan view of the seat cover ejector plate;

Figure 11 is a plan view of the finger-plate used for opening the pockets in the seat cover as it is being placed on the seat;

Figure 12 is an end view of the drum assembly used for actuating the paper ejector;

Figure 13 is a plan view of the structure shown in Figure 12;

Figure 14 is an end elevation, partly in section, of the drum assembly used to actuate the paper cover ejector showing the end opposite to that shown in Figure 12;

Figure 15 is an elevational view of the cam on the drum assembly used to actuate the paper cover ejector;

Figure 16 is a plan view of the seat-operated electric switch;

Figure 17 is a section taken along the line XVII—XVII of Figure 16;

Figure 18 is a section taken along the line XVIII—XVIII of Figure 17;

Figure 19 is a plan view of the shaft and spring thereon on which the door of the enclosing compartment is mounted;

Figure 20 is a sectional view of the valve structure and the water lines leading thereto, the various connections all being shown in the same plane;

Figure 21 is an elevational view partly in section showing the valve for operating the hydraulic motor, the cam attached thereto, and the spring for operating the cam and the apparatus whereby the spring is wound;

Figure 22 is a plan view of the cam used for operating the valve which operates the hydraulic motor;

Figure 23:
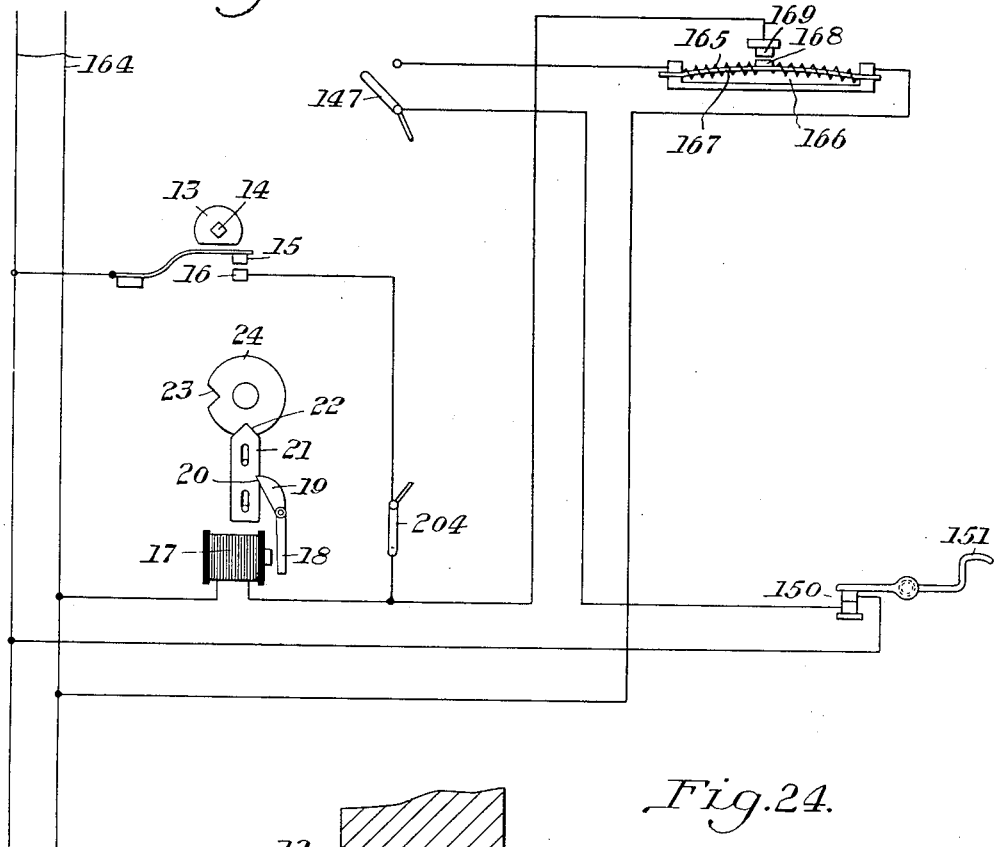
Figure 23 is an electric wiring diagram for the structure which I provide.

Before describing specifically the apparatus which I provide and its operation, I will briefly describe it and its operation in general without the use of reference characters.

In the embodiment of my invention shown in the drawings, a toilet bowl is provided. It is connected in the usual manner to a water supply through a flush valve and also to a sewer.

A cabinet is located adjacent the bowl which contains therein the toilet seat when not in use, and mechanism whereby the seat may be advanced to a usable position over the bowl and withdrawn into the cabinet. The cabinet also houses a seat cover magazine and the mechanism for placing a sanitary seat cover on the seat as it advances to usable position.

The motive power for moving the seat to a usable position and for withdrawing the same into the cabinet and for placing the sanitary cover on the seat, is provided by two hydraulic motors which are placed on opposite sides of a main driven shaft. These motors are of different sizes for reasons more specifically discussed hereinafter.

The apparatus is originally set in motion by an electric switch which, through mechanism more specifically described hereinafter, operates a valve which admits water under pressure to the large motor. The large motor drives the shaft in a clockwise direction, as shown in Figure 3 of the drawings. The small motor is adapted to drive the shaft in the opposite direction.

The valve is located in the water supply line leading to the large motor. The small motor is connected to the water supply line ahead of the valve, and consequently is under pressure at all times. When pressure is admitted to the large motor for driving the shaft in one direction, it does so against the pressure in the small motor.

When the main shaft is driven by the large motor, it operates, by means connected thereto, to drive the seat forward from the cabinet to a usable position over the bowl. Means is also connected to the main driven shaft for actuating an ejector plate and a finger plate which are adapted to place a sanitary cover in position to be engaged by the seat and placed thereon as it is advanced to usable position. After the seat assumes usable position, the motors cease to operate.

A switch is provided under the seat. It is adapted to be actuated by the removal of weight from the seat, and is adapted to actuate means for turning the valve in the water line and turn it to an exhaust position so that the pressure may be taken from the large motor. When the valve is turned to exhaust position, the pressure on the small cylinder operates to revolve the main driven shaft in a reverse direction, and to return the seat to the housing. Mechanism is attached to the main driven shaft which is actuated by the rotation thereof by the small motor for the purpose of automatically flushing the bowl as the seat is being withdrawn into the cabinet or housing. The sanitary seat cover is forced from the seat after it returns from usable position over the bowl to the cabinet and deposited in the bowl and carried away by the flushing thereof.

I will now more specifically describe the embodiment of my invention shown in the drawings.

In the drawings, a toilet bowl 2 is connected through a flush valve 3 to a main water line 4. A seat 5 is provided for use on the bowl 2. When not in use, the seat 5 is retained in the cabinet or housing indicated generally by the reference character 6. This cabinet 6 also houses the mechanism hereafter described for projecting the seat therefrom and for placing it in position for use over the bowl and for withdrawing the same from the bowl back into the compartment. The cabinet 6 also houses a magazine 7 in which a pad of paper seat covers is retained. The cabinet 6 also houses the mechanism whereby one of the seat covers is placed on the seat each time it is moved into usable position on the bowl. It also houses part of the mechanism whereby the bowl is automatically flushed when the weight of the user is removed from the seat.

The mechanism for ejecting the seat from the compartment to a usable position on the bowl and for placing a sanitary cover thereon is initially actuated by means of an electric switch. When the apparatus is placed in a private compartment, this electric switch may be embodied in the lock on the door of the compartment or may be embodied in the door-knob. In the drawings, I have shown the electric switch embodied in the lock on the door.

Figure 24:
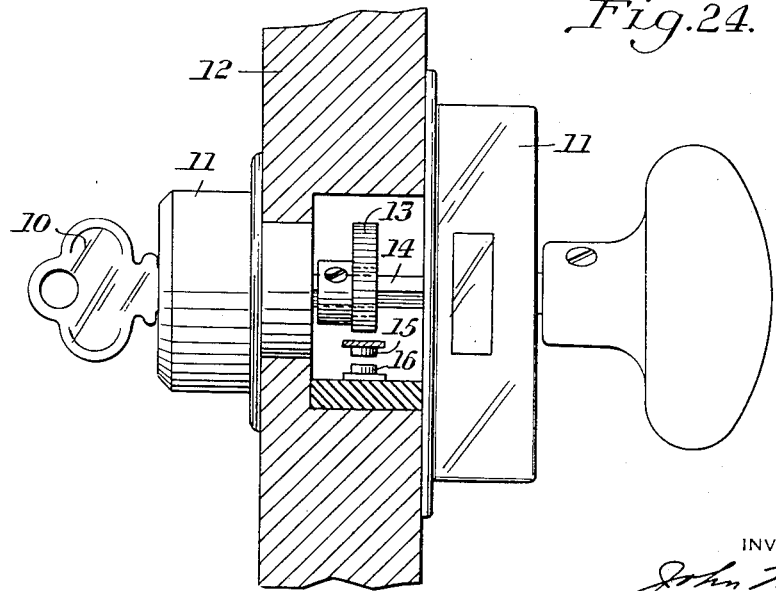
Figure 24 is an elevational view partly in section of the door lock for initially actuating the apparatus which I provide.

Referring to Figures 5, 23 and 24, when the key 10 is turned in the lock 11 on the door 12 it causes the fiber drum 13 on the shaft 14 to rotate and move contact 15 against the contact 16, which closes the electric circuit, thereby energizing the coil 17. The coil 17 attracts the arm 18 on one end of which is a latch 19, which is by this movement disengaged from a notch 20 in the sliding member 21. The member 21 is pointed on one end thereof and adapted to fit in notches 22 and 23 on the periphery of a rotating cam 24. The cam 24 is shown in detail in Figure 22.

Referring to Figures 5 and 21, when the latch 19 is released from notch 20, the member 21 is forced rearwardly as the cam 24 is rotated by the spring 25, which is under tension and is attached to the plate 26, which in turn is attached by dowel-pins 27 to the rotating cam. The cam 24 is attached at 37 to a stem 38 of a 3-way valve 39. When the rotating cam is turned from its initial position in the above manner, it in turn revolves the valve stem 38 into such a position as to admit water from the main supply line 40 through the valve and through the pipe line 41' to the large hydraulic motor 42.

When water is admitted to the large motor 42 in this manner, the piston 43 (Figure 3) is forced upwardly by the water pressure. A rack 44 is attached to the upper part of the piston 43 and is forced upwardly thereby. The rack 44 is adapted to engage the pinion gear 46 (Figures 3 and 5) which is keyed to the main drive shaft 45. As the rack 44 is forced upwardly by the piston, this rotates the main drive shaft 45. This movement of the main drive shaft is in a clockwise direction, as viewed in Figure 3.

As best shown in Figures 5, and 12–15, on one end of the main drive shaft 45 there is mounted a drum 47 and a second drum 48. The drum 47 is keyed to the shaft 45 and rotates with it at all times. The drum 48, however, is rotatably mounted on drum 47 and is provided with a latch 49, having a pin 57 thereon, which is adapted to normally engage a tooth 50 on the drum 47 by reason of the pressure exerted by the spring 51. As long as the latch is engaged, the two drums rotate together. A cam 52 having a shoulder 53 thereon is mounted on the hub of drum 47 so as to be independent of the rotation thereof. The one end of the cam is mounted on a supporting member 54 as at 55. As the two drums are rotated together, the shoulder 53 of the cam member 52 engages the shoulder 56 of latch 49 and raises it, thereby releasing the pin 57 of the latch 49 from engagement with the tooth 50 on the drum 47 and permitting the drum 47 to rotate thereafter independently of drum 48. This action takes place at the predetermined and appropriate time pointed out hereafter.

When the motor is originally actuated in the manner heretofore described, the drums 47 and 48 rotate in a counterclockwise direction, viewing the apparatus from the left side thereof, as shown in Figure 4. The drum 48 has a chain 66 attached thereto by means of a screw 67 (Figure 4). The other end of the chain 66 is attached to a lever 68 which is keyed to a shaft 69 which extends transversely of the cabinet. As the drum 48 is turned in said direction, the chain 66 is wound thereon and lever 68 raised, and the shaft 69 caused to rotate in a counter-clockwise direction as viewed in Figure 4. Lever arms 70 and 71 are located on opposite sides of the cabinet 6 and are keyed to the shaft 69. As the shaft rotates, they are carried forward thereby. The upper ends of lever arms 70 and 71 are each provided with vertically extending slots 72, which are adapted to cooperate with pins 73 which are located on the one end of the paper ejector 74. (Figures 4, 6 and 7.) As the levers 70 and 71 are carried forward by the rotation of the shaft 69, the paper ejector 74 is moved forward to the position shown in dotted lines in Figure 6 and in solid lines in Figure 7.

The sanitary seat cover shown in Figure 9, and which I prefer, comprises a sheet of thin paper having pockets 77 in the front end thereof, and having an opening centrally located therein and a flap 200 integrally attached to the sheet and extending into the opening. The flap is adapted to drop into the bowl after the cover is placed on the seat and the latter moved to usable position.

As the ejector plate 74 advances, the forwardly extending projections 75, which are curved upwardly as at 76, (Figures 6 and 10) engage the pockets 77 of the paper cover 78, which is the lowermost one in the pad of covers 79, and pull the cover forward, tearing it from the pad along the perforated line 80. The ejector plate 74 carries the paper cover forward only to the position shown in Figure 7.

When the ejector plate has advanced to the desired position, the shoulder 53 of the cam member 52 engages the shoulder 56 of latch 49 and raises the latch as heretofore described, thereby releasing the pin 57 of the latch from engagement with the tooth 50 on the drum 47 and stopping further rotation of the drum 48 and consequently of the shaft 69. This stops the forward movement of the ejector plate. It has completely performed its function.

A door 86 is provided for closing the opening 87 in the front of the compartment through which the seat and the paper emerge. This door is normally in closed position, as shown in Figures 3, 4 and 6, when the seat 5 is in the compartment and is stationary. The door 86 has long arms 88 attached thereto, which arms are mounted on and keyed to a transversely extending shaft 89 which is journaled in bearings 90 supported by brackets 90a, (Figures 6, 7 and 19). These arms 88 have cams 91 thereon which are adapted to engage rollers 92 on the lever arms 70 and 71 as the levers are moved forward, as described above. This raises the arms 88 and the door 87 so that the paper cover and the cover and seat ejecting mechanisms can emerge from the cabinet 6. The door is held in the open position shown in Figure 7 by means of a spring 93 on the shaft 89. This is best shown in Figure 19.

At the same time that the ejector plate is moved forward, the seat 5 is propelled forward. Referring to Figures 3, 4 and 5, the sprocket wheel 97 on the main shaft 45 is connected with the sprocket wheel 98 on the shaft 99 by means of a sprocket chain 100. The sprocket wheel 98 is keyed to the shaft 99. When the main drive shaft is revolved, the shaft 99 is caused to revolve. This in turn revolves sprocket wheels 101 and 102, which are keyed to the shaft 99. Sprocket wheels 101 and 102 engage sprocket chains 103 and 104, respectively, which are attached to the seat 5 by long, narrow links 105 which are pivotally mounted on the seat. When the sprockets 101 and 102 revolve, the chains 103 and 104 are caused to move thereover and the seat caused to move forward. The sprocket chains 103 and 104 are provided with guides 106 which prevent them from buckling as they push the seat 5 forward. The long, narrow links 105, which are used to attach the sprocket chains to the seat, permit the seat to be pushed beyond the ends of the chain guides and also permit a small vertical movement of the seat when in operative position over the bowl, which is desirable for the reasons pointed out hereinafter.

In the compartment below the seat is a finger plate 111 which has two flat fingers 112 attached to the forward end thereof. This plate is shown in detail in Figure 11. These fingers are pivotally attached to said plate by means of pivots 113, which are provided with springs 114 which are adapted to raise the fingers 112 when no downward pressure is exerted thereon. A flat spring 115 is attached to the top of the finger plate and is bent upwardly as at 116. A bridle 117 is attached to the rear of the compartment 6 and extends over the top of the finger plate 111 and under part of the spring 115. This bridle has an opening 118 therein which surrounds the spring 115. This finger plate is located in the apparatus below the seat and rests on the main frame.

As the seat 5 is propelled forward, the rear end of the spring 115 is engaged by a lug 119 located on the bottom of the seat 5. (See Figures 6 and 7.) The finger plate 111 is carried forward thereby as the seat is advanced. As it is carried forward, the fingers 112 pass from under retaining lugs 120 and are forced upwardly by the springs 114 against the ejector plate 74. As the finger plate continues to advance, the fingers 112 enter pockets 77 of the paper cover 78 and open them sufficiently for the forward ends of the seat as it advances to enter the pockets.

After the finger plate has advanced sufficiently to open the pockets and the seat has entered therein, the flat spring 115 is tripped by the bridle 117 from engagement with the lug 119 on the seat. The finger plate then ceases to further travel forward and remains stationary for an instant.

The finger plate and ejector plate at this time have performed their functions and may be withdrawn into the compartment. A chain 125 (Figure 4) is attached to the rear of the finger plate 111. This chain passes over a roller 126 (Figure 2) on the shaft 99, then over a roller 127 (Figure 4) mounted in bearings 128 which are attached to the lower part of the seat compartment. It then is looped downwardly so as to be brought into contact at a particular time with the roller 129 mounted on the top of the rack 130 which is attached to the top of piston 131 in the small motor 132. The end of the chain is then fastened to the main structure at 133. As the main shaft is rotated, the rack 130 on piston 131 of the small motor 132 engages spur gear 134 on the main shaft 45 and is pulled downwardly. At a fixed time the roller 129 engages the chain 125 and the continued downward motion of the rack causes the chain 125 to pull the finger plate 111 back into the cabinet to its rest position.

The ejector plate 74 is also at about the same time pulled back into the cabinet. As pointed out above, at the appropriate time the drum 48 is disengaged from the drum 47 and ceases to rotate therewith. By the time the latch 49 disengages the drum 48, the slack in the chain 135 (Figure 4) which is attached to the drum by a screw 136 is taken up. The continued rotation of drum 47 pulls the ejector plate back into inoperative position in the cabinet, by means of the chain 135 which is passed over a pulley wheel 137 and fastened to the lever arm 70 by means of a spring 138.

The seat 5 continues in its forward movement until it is placed in proper usable position over the bowl. As the seat advances it draws along with it the paper cover, as the front parts of the seat have by this time engaged the pockets 77. The pressure of the remaining paper covers in the paper magazine acts to properly smooth the cover on the seat and to cause the front ends of the seat to fit snugly in the pockets.

One end of the seat driving chain 103 is attached to lever 145 (Figure 4) which is keyed to the shaft 89, to which the arms 88 of the door 86 are also keyed. Immediately before the seat has assumed the proper position on the bowl, the chain 103 has become taut and pulls downwardly on the lever 145, thereby pulling the door 86 down so that it will rest on the paper cover and on the seat. This prevents the paper from being moved around to the extent of being moved from the seat.

One end of the seat driving chain 104 is attached to a lever 146 of snap switch 147 (Figure 4) which is normally in open position. The lever 146 is normally held in open position by means of a spring 148 which is attached to the arm 149, which is attached to the main frame. When the seat is completely advanced, the chain 104 pulls lever 146 and closes the electric circuit to the seat-operated switch indicated generally by reference character 150. (See Figure 23.)

The seat operated switch is best shown in Figures 16, 17 and 18. When the seat is placed over the bowl, the rear portion of the seat rests on the lever 151 of the switch 150 and also on a similar lever 152 on the left side of the apparatus. The spring lever 152 is fastened to the frame and is merely for the purpose of balancing the seat when it rests on the seat switch. When the seat rests on the lever 151 it pushes down and compresses the spring 153 and rotates the contact finger 154 and the contact 155 thereon away from contact member 156, breaking the electric circuit through the seat contacts. The seat switch lever 151 is mounted on a hollow shaft 157, which is lined with fiber or other insulating material 158. The contact finger 154 is on the end of a solid shaft 159 which is adapted to fit in the fiber-lined hollow shaft 157 and capable of rotation with or independently of the hollow shaft. Suitable fiber washers 160 are used so that the contact finger and its shaft are electrically insulated from the hollow shaft. A small helical spring 161 is mounted between a fiber washer 160 and a washer 162 held on the solid shaft by a cotter-pin 163. This spring is for the purpose of providing sufficient friction between the two shafts.

When the seat is in operative position over the bowl its own weight combined with the pressure of the door on the top of the seat moves the switch lever 151 down and compresses the spring 153 and rotates slightly the hollow shaft 157 upon which it is mounted. This rotation, due to friction between the shafts causes the contact finger 154 to move away from the contact 155 and break the circuit. The rotation of contact finger 154 is confined by a stop 164.

When additional weight is placed on the seat the spring 153 is further compressed. The contact finger remains against its stop and the seat circuit remains open.

When weight is removed from the seat the spring 153 rotates the seat switch lever 151 in the reverse direction and carries with it, through the friction device above described, the contact finger 154, thereby completing the electric circuit at this point, as the contact 155 on contact finger 154 is brought into contact with contact member 156.

When the seat switch is closed in the manner above described the electric current from the main line 164 (Figure 23) passes through switch 147 which is closed at this time, as heretofore pointed out, and passes to the heating coil 165 of a thermostat 166. The thermostat 166 is of the usual expansible type wherein both ends of the expanding member are solidly clamped. The expanding member 167 is clamped at each end but is free to move sidewise. A contact member 168 is integrally attached to the expanding member 167 and is located adjacent a contact member 169. The expanding member 167 is connected on one end to the circuit leading to the heating coil 165. The current, after the seat switch is closed, passes through coil 165 and heats the expanding member until the contacts 168 and 169 come together. The current then passes from the left side of the line 164, as shown in Figure 23, through the seat switch through switch 147 to the expansion member, through contacts 168 and 169, and back to the right side of the line through the coil 17 which is thereby energized.

The coil 17 being energized in the above manner again attracts the arm 18 and releases the latch 19 and permits the sliding member 21 to be forced rearwardly by pressure on the cam 24, exerted by the spring 25.

During the upward movement of the rack 44 which is attached to the piston 43 in the large cylinder 42, that is, while the seat 5 is being moved forward, the spring 25 is wound so that it will turn the cam 24 in a direction opposite to that in which it was turned during its initial movement.

Referring to Figures 3, 4 and 21, this spring winding is done in the following manner: A bar 180 having rollers 181 attached thereto is carried by the rack 44. The rollers bear on the helical plate 182, one on each side thereof, and turn the same as the rack 44 is moved upwardly. The plate 182 is attached at 183 to a round 184 which is supported by a bar member 185. Rotation of the helical plate rotates the round 184 to which the upper end of the spring 25 is fastened, thereby winding the spring.

When the coil 17 releases the latch 19 and permits the sliding member 21 to be forced rearwardly by the pressure on the cam exerted by the spring, the spring turns the cam 24 back to exhaust position. The water in the large motor is then discharged therefrom through pipe 41 and exhaust line 186 which leads to the bowl 2 through the flushing line 187.

It will be noted that the valve 39 is attached to the large motor 42, which is approximately twice the size of the small motor 132. It will be also noted that the small motor is connected by tube 188 to the feed line 40 ahead of the valve 39. The piston in this small motor is therefore subject to pressure at all times. The fact that the one motor is larger than the other permits the larger motor 42 to operate the shaft 45 against the pressure on the small cylinder. This takes place during the upward stroke of piston 43 of the large motor 42. As it advances, the rack 130 is forced downwardly, thereby forcing piston 131 of the small motor downwardly and discharging the water from the small motor 132.

When the valve 39 is turned to exhaust position by the cam 24 in the manner above described, the pressure on the piston 131 in the small cylinder 132 forces the piston upwardly, thereby, through the rack 130, which is attached thereto, and spur gear 134, rotating the shaft 45 in a clockwise direction, as viewed in Figure 4; that is, in a direction opposite to the original movement. This movement operates to place the seat back in inoperative or non-usable position in the housing.

As soon as seat-driving chain 104 is provided with sufficient slack by the rearward movement of seat 5, the spring 148 attached to the arm 146 on snap switch 147 pulls the lever 146, thereby breaking the electric circuit through switch 147.

At the same time seat driving chain 103 ceases to pull downwardly on lever 145 mounted on the transversely extending shaft 89, thereby permitting the door 86 to freely ride on the seat as it is withdrawn rearwardly into the compartment. As the seat recedes into the housing, the door 86 riding freely on the seat scrapes the paper from the seat and holds it over the bowl and prevents it from entering the seat compartment or paper magazine.

A crank arm 189 (Figures 5 and 5a) is mounted on one end of the main drive shaft 45. This crank arm is held against the collar 190 on the motor shaft by means of a helical spring 191 located inside the shaft of the crank arm. A single clutch tooth 192 on the end of the collar 190 engages a similar tooth 193 on the end of the crank. This causes the crank 189 to rotate with the motor shaft when it is turning in one direction only. The crank arm is so arranged that it turns with the motor shaft only when the shaft is rotated in the proper direction to return the seat to the seat compartment; that is, when the shaft 45 is being rotated in a clockwise direction, as viewed in Figure 4. A coiled spring 194 is placed around the crank arm 189 and one end fastened to a bolt 195 on the main frame of the cylinder. The other end of spring 194 is free. This spring prevents the crank from moving when the motor is running in the direction necessary to place the seat on the bowl.

Crank 189 has pivotally attached thereto a link 197 by means of a pin 196. One end of a chain 198 is fastened to link 197. The other end of chain 198 is attached to a handle 199 of the flush valve 3. (Figure 1.) When the crank arm 189 is moved to its highest position, it pulls on the chain 198 which pulls on the handle 199, thereby flushing the bowl. This operation takes place during the rearward movement of the seat 5.

When the flush valve 3 is operated in the above manner during the rearward movement of the seat 5, a sudden pressure drop in the supply line is caused. Due to this drop in pressure in the supply line the motor stops as there is insufficient water pressure at this time to raise the piston 131 of the small motor 132. The motor does not begin to operate again until the automatic flush valve 3 closes.

Small, thin rubber pads 212 are provided on the bottom of the front portion of the seat 5. When the seat has a cover thereon and is located over the bowl, these small rubber pads bear on the bottom of the pockets 77 of the paper cover, which in turn bears on the rim 213 of the bowl 2. These pads aid in the removal of the paper cover from the bowl and prevent the same from sticking thereto whenever it is wet. These pads are not essential unless the bowl is wet. When the bowl is wet, however, there is a tendency for the front part of the cover to stick thereto. Due to the fact that the friction between the rubber and the wet paper is greater than the friction between the bowl and the wet paper, the rubber pads aid in pulling the front portion of the cover from the bowl.

As the seat is pulled rearwardly, the front of the paper cover is pulled from the bowl and drops down into the bowl. The pulling of the forward portion of the seat cover into the bowl is facilitated by a flap on the paper cover. When a seat cover is placed on the seat, a center portion or flap 200, which is free from the balance of the cover except at the front thereof, falls down into the bowl and remains there. When the bowl is flushed in the manner above described, this flap serves to pull the forward portion of the seat cover into the bowl. When the forward portion of the seat cover falls into the bowl, the pockets 77 rapidly fill with water and the cover is thereby carried away. This takes place, as stated above, when the seat has been partially returned to the seat compartment. By providing means for stopping the seat during its rearward movement and at the time that the bowl is being flushed, the removal of the paper cover in the above described fashion is insured and the paper cover will not be carried back into the seat compartment by the seat.

As soon as the automatic valve 3 closes, the pressure in the line again rises and is sufficient to start the motor again. Rack 130 continues in its upward movement and the seat continues to be withdrawn from the bowl until it is placed in normal position in the cabinet.

A sliding member 201 is mounted on the top of the seat plate 202. (Figure 3.) One end of this sliding member is turned upwardly as at 203 so that as the seat 5 is moved rearwardly the rear end thereof will engage the upwardly extending portion of the sliding member and pull the member rearwardly. The sliding member is attached to the lever of snap switch 204. As the seat pulls the sliding member rearwardly, the lever of snap switch 204 is pulled back, thereby closing the electric circuit through the switch. The circuit through the coil 17 is then again ready to be operated from the door lock. A spring 205 is attached to the sliding member 201 and pulls the same forward as the seat advances to usable position, thereby breaking the circuit through coil 17 and the lock, and preventing the valve from being operated by the lock until operated by the seat switch.

The sliding member 201 also has a hook 206 integrally attached thereto. A chain 207 is attached to said hook and passes over pulley wheels 208 and 209 and is fastened to the end 210 of an adjustable coupling 211. The adjustable coupling 211 is pivotally attached to lever 145 which is keyed to shaft 89. As the seat 5 pulls the sliding member 201 rearwardly, a pull is exerted on chain 207, thereby pulling lever arm 145 downwardly and closing the door 86. The seat is now completely enclosed in the cabinet 6 and remains there until the door lock switch is again operated and the motor started thereby.

While I have described and shown a preferred embodiment of my invention, it is to be understood that it is not to be limited thereby, but may be otherwise embodied within the scope of the appended claims.

I claim:

1. Toilet apparatus comprising a toilet bowl, a seat normally in non-usuable position relative to the bowl, means for moving the seat substantially horizontally to a usable position over the bowl, a sanitary cover for the seat and means for placing the sanitary cover on the seat as the latter advances to a usable position over the bowl.

2. Toilet apparatus comprising a toilet bowl, a seat normally in non-usable position relative to the bowl, means for moving the seat substantially horizontally to a usable position relative to the bowl, a sanitary cover for the seat, means for placing the seat cover on the seat as it advances to usable position, and means for withdrawing the seat to a non-usable position.

3. Toilet apparatus comprising a toilet bowl, a seat normally in non-usable position relative to the bowl, means for moving the seat substantially horizontally to a usable position relative to the bowl, a plurality of sanitary covers for the seat, means for placing a cover on the seat as it advances to usable position, means for withdrawing the seat to a non-usable position, and means for discharging the cover into the bowl as the seat is withdrawn to a non-usable position.

4. Toilet apparatus comprising a toilet bowl, a seat normally in non-usable position relative to the bowl, means for moving the seat substantially horizontally to a usable position relative to the bowl, a plurality of sanitary covers for the seat, means for placing a cover on the seat as it advances to usable position, means for withdrawing the seat to a non-usable position, means for discharging the cover into the bowl as the seat is withdrawn, and means for automatically flushing the bowl as the seat is withdrawn to non-usable position.

5. Toilet apparatus comprising a toilet bowl, a seat normally in a non-usable position relative to the bowl, means for moving the seat horizontally to a usable position over the bowl and for withdrawing the seat to said non-usable position after a variable time interval during which the seat reposes in usable position, a plurality of sanitary seat covers, and means for placing the seat cover on the seat as it advances to usable position.

6. Toilet apparatus comprising a toilet bowl, a seat, a cabinet adjacent the bowl in which the seat is normally retained in a substantially horizontal non-usable position, said cabinet having a door thereon, means for moving the seat substantially horizontally from said cabinet to a usable position relative to the bowl, and means for opening the door of the cabinet as the seat is moved therefrom.

7. Toilet apparatus comprising a bowl, a seat, a cabinet adjacent the bowl in which the seat is normally retained in a substantially horizontally non-usable position, said cabinet having a door thereon, means for moving the seat substantially horizontally from said cabinet to a usable position relative to the bowl, means for opening the door of the cabinet as the seat is moved therefrom, means for automatically returning the seat to said cabinet after a variable time interval during which the seat reposes in usable position, and means for closing the door of the cabinet after the seat is returned thereto.

8. Toilet apparatus comprising a bowl, a seat, a cabinet adjacent the bowl in which the seat is normally retained in substantially horizontal non-usable position, said cabinet having a door thereon, a plurality of sanitary seat covers in the cabinet, means for moving the seat substantially horizontally from the cabinet to a usable position relative to the bowl, and means for opening the door and partially projecting said cover from the cabinet and placing the cover in position to be engaged by the seat as the seat moves to a usable position over the bowl.

9. Toilet apparatus comprising a bowl, a seat, a cabinet adjacent the bowl in which the seat is normally retained in substantially horizontal non-usable position, said cabinet having a door thereon, a plurality of sanitary seat covers in the cabinet, means for moving the seat substantially horizontally from the cabinet to a usable position relative to the bowl, means for opening the door and for partially projecting a seat cover from the cabinet and placing the cover in position to be engaged by the seat as the seat moves to a usable position over the bowl, and means for partially closing the door so that it will rest on the cover on the top of the seat after the seat has been at least partially projected from the cabinet.

10. In combination with a toilet bowl, a seat normally in non-usable position relative to the bowl, means including a hydraulic motor and a shaft operatively connected thereto and driven thereby for moving the seat substantially horizontally to a usable position over the bowl, a plurality of sanitary seat covers, a plurality of plates adapted to be actuated by rotation of said shaft for placing a sanitary cover in position to be engaged by and placed on the seat as it advances to usable position over the bowl.

11. In combination with a toilet bowl, a seat normally in non-usable position relative to the bowl, means including a hydraulic motor and a shaft operatively connected thereto for moving the seat substantially horizontally to a usable position over the bowl, a plurality of sanitary seat covers, a plurality of plates adapted to be actuated by rotation of said shaft for placing a sanitary cover in position to be engaged by and placed on the seat as it advances to usable position over the bowl, and means connected to the shaft for returning said plates to rest position as the seat continues to advance to usable position.

12. In combination with a toilet bowl, a seat normally in non-usable position relative to the bowl, means including a hydraulic motor and a shaft operatively connected thereto for moving the seat substantially horizontally to a usable position over the bowl, a plurality of sanitary seat covers, a plurality of plates adapted to be actuated by rotation of said shaft for placing a sanitary cover in position to be engaged by and placed on the seat as it advances to usable position over the bowl, means connected to the shaft for returning said plates to rest position as the seat continues to advance to usable position, and means for rotating the shaft in a reverse direction for returning the seat to non-usable position.

13. In combination with a toilet bowl, a seat normally in non-usable position relative to the bowl, means including a hydraulic motor and a shaft operatively connected thereto for moving the seat substantially horizontally to a usable position over the bowl, a plurality of sanitary seat covers, a plurality of plates adapted to be actuated by rotation of said shaft for placing a sanitary cover in position to be engaged by and placed on the seat as it advances to usable position over the bowl, means connected to the shaft for returning said plates to rest position as the seat continues to advance to usable position, means for rotating the shaft in a reverse direction for returning the seat to non-usable position, means for flushing the bowl, and means attached to said shaft for operating the flushing means as the seat returns to non-usable position.

14. In combination with a toilet bowl, a seat, a cabinet in which the seat is normally retained, means for moving the seat to usable position over the bowl, a plurality of sanitary seat covers having pockets therein in said cabinet, an ejector plate, means for moving the ejector plate so as to engage a cover and place it over the seat as it advances to usable position, and a finger plate, means for actuating said plate for moving it to a position so as to open the pockets in the cover and admit the seat thereto, said seat thereby carrying said cover forward as it advances to usable position.

15. In combination with a toilet bowl, a seat, a cabinet in which the seat is normally retained, means for moving the seat to usable position over the bowl, a plurality of sanitary seat covers having pockets therein in said cabinet, an ejector plate, means for moving the ejector plate so as to engage a cover and place it over the seat as it advances to usable position, a finger plate, means for actuating said plate for moving it to a position so as to open the pockets in the cover and admit the seat thereto, said seat thereby carrying said cover forward as it advances to usable position, and means for returning the seat to normal position in the cabinet after a variable time interval during which the seat reposes in usable position over the bowl.

16. Toilet apparatus comprising a bowl, a seat normally in non-usable position relative to the bowl, means including a hydraulic motor for moving the seat to a usable position over the bowl, means for supplying pressure to the motor, electrically actuated means for admitting pressure to the motor, a seat operated electric switch adapted to be operated by the placing on and removal from the seat of weight, a thermostat operated thereby, said thermostat being adapted to electrically actuate the aforesaid means for admitting pressure to the motor and cause the same to relieve the motor of pressure, and additional means for returning the seat to non-usable position.

17. In toilet apparatus of the character described, a toilet bowl, a seat normally in non-usable position relative to the bowl, a plurality of seat covers, means for moving the seat to a usable position over the bowl, means for placing a seat cover on the seat as it advances to usable position, means for returning the seat to non-usable position, and pads on the bottom of the seat adapted to engage the paper cover and pull the same free of the rim of the bowl as the seat recedes to non-usable position.

18. Toilet apparatus comprising a toilet bowl, a seat, a cabinet in which the seat is normally retained in non-usable position relative to the bowl, a door on said cabinet, means for moving the seat to a usable position over the bowl, means for opening the cabinet door as the seat moves to usable position, a plurality of sanitary seat covers in said cabinet, means for placing the cover on the seat as it advances to usable position over the bowl, means for partially closing the door after the cover has been placed on the seat, said door resting on the cover on the seat, a flap attached to the cover adapted to repose in the bowl when the seat is in usable position, means for returning the seat to non-usable position, actuated by removal of weight from the seat, and a pad on the bottom of the seat adapted to engage the cover, said flap, pad and door causing the cover to be discharged into the bowl as the seat is returned to the cabinet.

19. Toilet apparatus comprising a toilet bowl, a seat, a cabinet in which the seat is normally retained in non-usable position relative to the bowl, a door on said cabinet, means for moving the seat to a usable position over the bowl, means for opening the cabinet door as the seat moves to usable position, a plurality of sanitary seat covers in said cabinet, means for placing the cover on the seat as it advances to usable position over the bowl, means for partially closing the door after the cover has been placed on the seat, said door resting on the cover on the seat, a flap attached to the cover adapted to repose in the bowl when the seat is in usable position, means for returning the seat to non-usable position, actuated by removal of weight from the seat, a pad on the bottom of the seat adapted to engage the cover, said flap, pad and door causing the cover to be discharged into the bowl as the seat is returned to the cabinet, and means for flushing the bowl, said means being adapted to operate after the seat has been partially returned, and being adapted to cause the return movement of the seat to cease during the flushing operation.

20. In combination with a toilet bowl, a seat normally in non-usable position relative to the bowl, means for moving the seat to a usable position over the bowl, means for returning the seat to a non-usable position, and means for flushing the bowl as the seat is returned to non-usable position, said flushing means being adapted to cause the return movement of the seat to cease during the flushing operation.

21. In toilet apparatus of the character described, a hydraulic motor, a water supply line leading to the motor, a valve in said line, a cam plate attached to the stem of the valve, said cam plate having a plurality of notches in the periphery thereof, means attached to the cam plate for rotating the same in either direction, a sliding member having a pointed end adapted to cooperate with the notches in the cam plate and normally hold the same against rotation, and electrically actuated means for releasing the sliding member whereby the cam is rotated and the valve operated to admit pressure to the motor.

22. In toilet apparatus of the character described, a hydraulic motor, a water supply line leading thereto, a valve in said line, and electrically actuated means for rotating the valve whereby pressure is admitted to the motor for operating the same.

23. In toilet apparatus of the character described, a hydraulic motor, a water supply line leading thereto, means for admitting water under pressure to the motor, a main shaft operatively connected to and driven by the motor, a toilet bowl, a seat normally in non-usable position relative to the bowl, and means connected to and driven by said shaft for moving the seat to a usable position over the bowl.

24. In toilet apparatus of the character described, a hydraulic motor, means for supplying water under pressure thereto, a main shaft, means operatively connecting the motor and the shaft for driving the latter, a toilet bowl, a seat normally in non-usable position relative to the bowl, means connected to and driven by the main shaft for moving the seat to a usable position over the bowl, a plurality of sanitary seat covers, and means connected to and driven by said shaft for placing a seat cover in position to be engaged and carried forward by the seat as it moves to usable position.

25. In toilet apparatus of the character described, a hydraulic motor, means for supplying water under pressure thereto, a main shaft, means operatively connecting the motor and the shaft for driving the latter, a toilet bowl, a seat normally in non-usable position relative to the bowl, means connected to and driven by the main shaft for moving the seat to a usable position over the bowl, a plurality of seat covers having pockets in the forward ends thereof, an ejector plate operatively connected to the main shaft adapted to engage a seat cover and place it in position to be engaged by the seat, and a finger plate adapted to be moved forward by the seat as it advances and adapted to open the pockets in the seat cover so that the seat can enter therein as it advances to usable position.

26. In toilet apparatus of the character described, a hydraulic motor, means for supplying water under pressure thereto, a main shaft, means operatively connecting the motor and the shaft for driving the latter, a toilet bowl, a seat normally in non-usable position relative to the bowl, means connected to and driven by the main shaft for moving the seat to a usable position over the bowl, a plurality of seat covers having pockets in the forward ends thereof, an ejector plate operatively connected to the main shaft adapted to engage a seat cover and place it in position to be engaged by the seat, and a finger plate adapted to be moved forward by the seat as it advances and adapted to open the pockets in the seat cover so that the seat can enter therein as it advances to usable position, and means for returning the ejector and finger plates to rest position as the seat continues to move to usable position.

27. In toilet apparatus of the character described, a motor, means for actuating the motor, a main shaft connected to and driven by the motor, a toilet bowl, a seat therefor, a cabinet adjacent the bowl in which the seat is normally retained, a door on said cabinet, means driven by the main shaft for moving the seat from said cabinet to a usable position over the bowl, means driven by the main shaft for operating said door, and means for partially closing the door as the seat comes to rest in a usable position over the bowl.

28. In toilet apparatus of the character described, a main driven shaft, a motor, means connecting the motor and the shaft, said motor being adapted to rotate the shaft a predetermined amount in one direction, a second motor, and means connecting the second motor to the shaft, said second motor being adapted to rotate the shaft a predetermined amount in the reverse direction.

29. In toilet apparatus of the character described, a main driven shaft, a motor, means connecting the motor and the shaft, said motor being adapted to rotate the shaft a predetermined amount in one direction, a second motor, means connecting the second motor to the shaft, said second motor being adapted to rotate the shaft a predetermined amount in the reverse direction, and electrically actuated means for actuating the motors.

30. In toilet apparatus of the character described, a bowl, a seat normally in non-usable position relative to the bowl, a main driven shaft, a motor, means connecting the motor and the shaft, said motor being adapted to rotate the shaft a predetermined amount in one direction, a second motor, means connecting it to the shaft, said second motor being adapted to rotate the shaft in reverse direction a predetermined amount, and means connecting the seat and the shaft whereby the seat is moved to a usable position over the bowl by rotation of the shaft in one direction and withdrawn into non-usable position by rotation in the other direction.

31. In toilet apparatus of the character described, a bowl, a seat normally in non-usable position relative to the bowl, a main driven shaft, a motor, means connecting the motor and the shaft, said motor being adapted to rotate the shaft a predetermined amount in one direction, a second motor, means connecting the second motor to the shaft, said second motor being adapted to rotate the shaft in reverse direction a predetermined amount, means connecting the seat and the shaft whereby the seat is moved to a usable position over the bowl by rotation of the shaft in one direction and withdrawn into non-usable position by rotation in the other direction, a plurality of sanitary seat covers and means connected to and operated by the shaft for engaging and moving a seat cover to a position to be engaged by the seat as it moves to a usable position over the bowl.

32. In toilet apparatus of the character described, a bowl, a seat normally in non-usable position relative to the bowl, a main driven shaft, a motor, means connecting the motor and the shaft, said motor being adapted to rotate the shaft a predetermined amount in one direction, a second motor, means connecting the second motor to the shaft, said second motor being adapted to rotate the shaft in reverse direction a predetermined amount, means connecting the seat and the shaft whereby the seat is moved to a usable position over the bowl by rotation of the shaft in one direction and withdrawn into non-usable position by rotation in the other direction, a plurality of sanitary seat covers having pockets in the forward ends thereof, means connected to and driven by the shaft for placing a sanitary cover in position to be engaged by the seat as it moves to a usable position over the bowl, and means actuated by the seat as it moves forward for opening the pockets in the cover so as to admit the seat thereto.

33. In toilet apparatus of the character described, a large hydraulic motor, a water supply line leading thereto, a 3-way valve in said line, an exhaust line connected to said valve, a small hydraulic motor, a pipe line connecting the small motor to said water supply line ahead of the valve, said small motor being under pressure at all times, a main driven shaft, means connecting the large motor to the shaft for rotating the shaft in one direction, means connecting the small motor to the shaft for rotating it in the reverse direction, means for turning the valve to a position to admit water to the large motor for actuating the same, whereby the motor drives the shaft a predetermined amount and for thereafter returning the valve to exhaust position, whereby the small motor is caused to rotate the shaft in a reverse direction.

34. Toilet apparatus comprising a toilet bowl, a seat normally in a substantially horizontal non-usable position relative to the bowl, means including a motor for moving the seat substantially horizontally to a usable position over the bowl, and automatic means for placing a sanitary cover on the seat.

35. Toilet apparatus comprising a toilet bowl, a seat normally in a substantially horizontal non-usable position relative to the bowl, means including a motor for moving the seat substantially horizontally to a usable position over the bowl, and automatic means for placing a sanitary cover on the seat as it moves to a usable position.

36. Toilet apparatus comprising a toilet bowl, a seat normally in a substantially horizontal non-usable position relative to the bowl, means including a motor for moving the seat substantially horizontally to a usable position over the bowl, automatically actuated means for placing a sanitary cover on the seat, and means for automatically returning the seat to a non-usable position.

37. Toilet apparatus comprising a toilet bowl, a seat normally in a substantially horizontal non-usable position relative to the bowl, means including a motor for moving the seat substantially horizontally to a usable position over the bowl, automatic means for placing the sanitary cover on the seat, means for automatically returning the seat to a non-usable position, and means for removing the cover from the seat as it returns to a non-usable position.

JOHN MOORE.